(12) United States Patent
Suzuki et al.

(10) Patent No.: US 7,049,723 B2
(45) Date of Patent: May 23, 2006

(54) DC MOTOR

(75) Inventors: Yuzuru Suzuki, Shizuoka-ken (JP); Sakae Fujitani, Shizuoka-ken (JP); Seiichi Matsuura, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/046,629

(22) Filed: Jan. 14, 2002

(65) Prior Publication Data
US 2002/0130577 A1   Sep. 19, 2002

(30) Foreign Application Priority Data
Jan. 15, 2001  (JP) ................................ 2001/7048

(51) Int. Cl.
*H02K 1/27*  (2006.01)

(52) U.S. Cl. ........................... 310/156.47; 310/156.43; 310/90; 310/51; 310/254; 310/261; 310/156.13; 310/156.12; 310/156.22

(58) Field of Classification Search ........... 310/156.82, 310/152, 156.16, 180, 156.38, 156.43–156.47, 310/254, 156.22, 156.13, 156.12, 261, 51, 310/90
See application file for complete search history.

(56) References Cited

U.S. PATENT DOCUMENTS

| | | | | |
|---|---|---|---|---|
| 3,525,005 | A | * | 8/1970 | Beyers .................. 310/156.16 |
| 4,035,677 | A | * | 7/1977 | Kusayama et al. ........... 310/42 |
| 4,513,216 | A | * | 4/1985 | Muller .................. 310/156.68 |
| 4,639,627 | A | * | 1/1987 | Takekoshi et al. ..... 310/156.22 |
| 4,782,259 | A | * | 11/1988 | Shikama et al. ........ 310/156.47 |
| 4,823,038 | A | * | 4/1989 | Mizutani et al. ....... 310/156.47 |
| 4,998,032 | A | * | 3/1991 | Burgbacher .................. 310/51 |
| 5,034,642 | A | * | 7/1991 | Hoemann et al. ........... 310/152 |
| 5,053,664 | A | * | 10/1991 | Kikuta et al. ................ 310/114 |
| 5,111,094 | A | * | 5/1992 | Patel et al. ............ 310/156.22 |
| 5,128,570 | A | * | 7/1992 | Isozaki ........................ 310/180 |

(Continued)

FOREIGN PATENT DOCUMENTS

JP   56117567 A  *  9/1981

(Continued)

OTHER PUBLICATIONS

Electric Motors and Motor Controls; Jeff Keljik; 1995; Delmar Publishers; pp. 139-142.*

*Primary Examiner*—Darren Schuberg
*Assistant Examiner*—Yahveh Comas
(74) *Attorney, Agent, or Firm*—Muirhead and Saturnelli, LLC

(57) ABSTRACT

The disclosure describes a DC motor including a rotor unit arranged within the motor body and has a cylindrical field magnet fixed to an outer surface of a holder. The holder has a rotating shaft press-fitted through the center, and the cylindrical field magnet has the S and the N poles alternately around a circumference. There is a stator unit which is circumferentially arranged around the rotor unit, that is made of a plurality of stator yokes that are arranged so that they oppose the field magnet through a small gap. Each of the stator yokes is formed by circumferentially stacking a large number of thin plates, each consisting of a salient pole, and a number of coil units, each formed by winding a magnet wire on a bobbin, and mounting the bobbins on the stator yokes. In the described arrangement, each of the S and N poles has a plurality of stages formed in an axial direction and shifted from each other in the circumferential direction by a predetermined shift amount with respect to the field magnet.

14 Claims, 4 Drawing Sheets

U.S. PATENT DOCUMENTS

| | | | |
|---|---|---|---|
| 5,334,894 A * | 8/1994 | Nakagawa | 310/112 |
| 5,355,044 A * | 10/1994 | Uchida et al. | 310/156.47 |
| 5,369,324 A * | 11/1994 | Saether | 310/156.43 |
| 5,397,951 A * | 3/1995 | Uchida et al. | 310/156.21 |
| 5,717,268 A * | 2/1998 | Carrier et al. | 310/156.06 |
| 5,723,931 A * | 3/1998 | Andrey | 310/179 |
| 5,856,718 A * | 1/1999 | Matsushita et al. | 310/90 |
| 6,057,621 A * | 5/2000 | Suzuki et al. | 310/156.12 |
| 6,144,132 A * | 11/2000 | Nashiki | 310/156.55 |
| 6,177,751 B1 * | 1/2001 | Suzuki et al. | 310/269 |
| 6,218,760 B1 * | 4/2001 | Sakuragi et al. | 310/254 |
| 6,252,323 B1 * | 6/2001 | Nishikawa et al. | 310/156.01 |
| 6,657,349 B1 * | 12/2003 | Fukushima | 310/156.47 |

FOREIGN PATENT DOCUMENTS

| | | | |
|---|---|---|---|
| JP | 63194552 A * | 8/1988 | |
| JP | 02106152 A * | 4/1990 | |
| JP | 05168181 A * | 7/1993 | |
| JP | 11146616 A * | 5/1999 | |
| JP | 2000069703 A * | 3/2000 | |

* cited by examiner

DC MOTOR

BACKGROUND OF THE INVENTION

1. Field of the Invention

The present invention relates to a DC motor and, more particularly, to a simple-structure, low-vibration DC motor in which cogging is reduced while the performance such as torque is maintained.

2. Description of the Prior Art

In recent years, as the performance of various types of devices such as OA devices are improved, a high-performance (e.g., high torque), low-cogging, low-vibration, high-quality motor is sought for as a DC motor used in such a device. To meet this demand, improvement in inner rotor type DC motors used in these various types of devices is under development as needed. A demand for higher performance such as, for example, a demand for "higher torque" and, on the other hand, a demand for higher quality such as, for example, a demand for "lower cogging and lower vibration" are contradictory, and it is difficult to meet both demands simultaneously.

In an inner rotor type DC motor, a rotor unit is rotatably arranged inside a stator unit, and the rotor unit is rotated by the interaction of the magnetic fluxes of the stator unit and rotor unit.

FIG. 1A is a perspective view of a rotor unit in a conventional inner rotor type DC motor, and FIG. 1B is a view showing the developed pattern of S and N poles formed on the surface of the field magnet of this DC motor by magnetization.

As shown in FIG. 1A, a rotor unit 29 is comprised of a holder 22, a shaft 21 pressed into the holder 22 to be fixed to it and serving as the rotation center, and a field magnet 26 coaxially fixed to the outer surface of the holder 22. The outer surface of the field magnet 26 is magnetized in the circumferential direction at predetermined pitches to form magnetic poles developed pattern as shown in FIG. 1B.

As is apparent from the developed pattern shown in FIG. 1B, S and N poles are alternatively formed by magnetization on the field magnet 26 in the circumferential direction with the same pole width (W1=W2). Consequently, magnetic flux changes in all the magnetic poles occur simultaneously and sharply, causing cogging.

To achieve low cogging, for example, the magnetic poles of the field magnet 26 may be skewed. In this case, a decrease in torque is inevitable. Therefore, this method can be employed only when the torque characteristics have a sufficient margin. In addition, the fabrication of a magnetizing jig is extremely difficult and is accordingly expensive. Also, maintenance of the magnetizing jig is difficult to perform.

Since the skew angle can be obtained only with a cut and try manner, it cannot be obtained easily. Phase correction of the magnetic poles to correspond to a decrease in a harmonic component cannot be performed to decrease the vibration.

SUMMARY OF THE INVENTION

The present invention has been made in consideration of the above situation in the prior art, and has as its object to provide a low-price, simple-structure, low-vibration DC motor in which cogging is reduced while the performance such as torque is maintained.

In order to achieve the above object, according to the main aspect of the present invention, there is provided a DC motor comprising: a rotor unit which is rotatably arranged within the motor and has a cylindrical field magnet fixed to holder means into which a rotating shaft is press-fitted at a center thereof, said cylindrical field magnet being magnetized such that S and N poles alternate with each other in a circuferential direction thereof; and a stator unit which is circumferentially arranged around said rotor unit and is comprised of a plurality of stator yokes so arranged as to oppose said field magnet with a small gap, each of said stator yokes being formed by circumferentially stacking a large number of thin plates each of which constitutes a salient pole, and a plurality of coil units, each being formed by winding a magnet wire on a bobbin and mounted on each of said stator yokes; wherein each of the S and N poles has a plurality of stages formed in an axial direction and shifted from each other in the circumferential direction of said field magnet with a predetermined shift amount.

According to the subsidiary aspect of the present invention, the shift amount of the positions of the magnetic poles falls within a range of 12° to 50° in an electrical angle.

As is apparent from the above aspects, in the DC motor according to the present invention, the field magnet is magnetized divisionally into the plurality of stages in the axial direction such that the S and N poles alternately, repeatedly change in the circumferential direction at every stage, and the positions of the magnetic poles of the respective stages are shifted from each other. Therefore, the structure is simplified, the cogging is reduced, and the vibration is decreased while the performance such as torque is maintained.

Since the shift amount of the positions of the magnetic poles falls within the range of 12° to 50° in the electrical angle, cogging can be reduced effectively, so the vibration can be decreased.

Regarding the rotor unit, the field magnet is made cylindrical and is fixed to the outer surface of the shaft through the sleeve at the center, and the two ends of the rotor unit are closed with holders. Hence, a simple structure that minimizes the amount of material to be used can be realized, and the field magnet can be fixed reliably.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 2A and 2B show an inner rotor type DC motor according to the present invention, in which FIG. 2A is a partially cutaway plan view, and FIG. 2B is a partially cutaway side view;

DETAILED DESCRIPTION OF THE PREFERRED EMBODIMENT

A preferred embodiment of the present invention will be described with reference to the accompanying drawings.

Figure 1A:
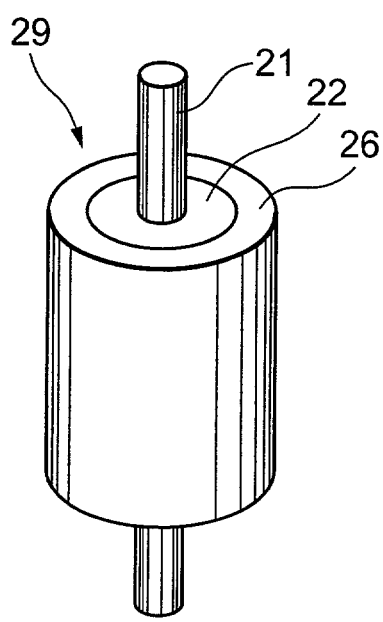
FIG. 1A is a perspective view showing a conventional rotor unit.
Figure 1B:
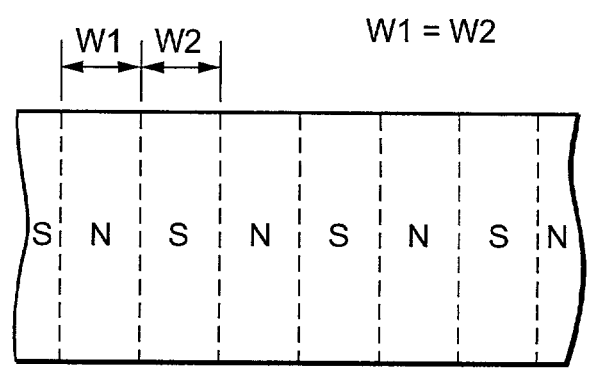
FIG. 1B is a view showing the developed pattern of S and N poles formed on the surface of the rotor unit by magnetization.
Figure 2A:
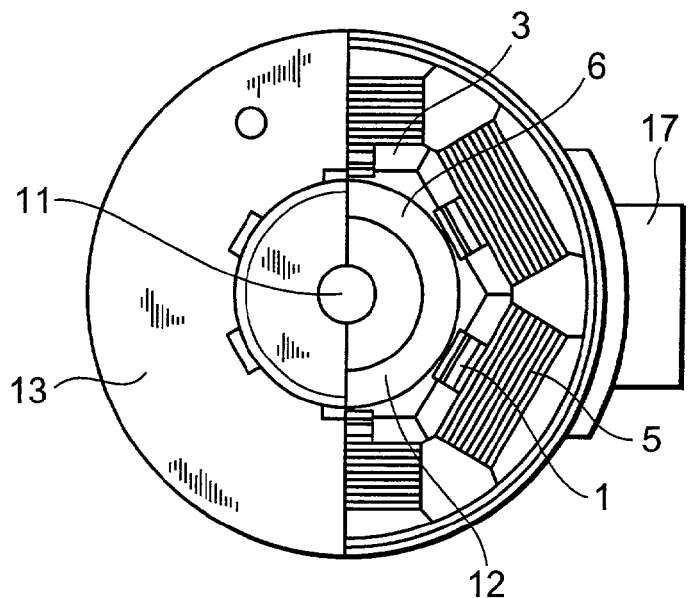
Figure 2B:
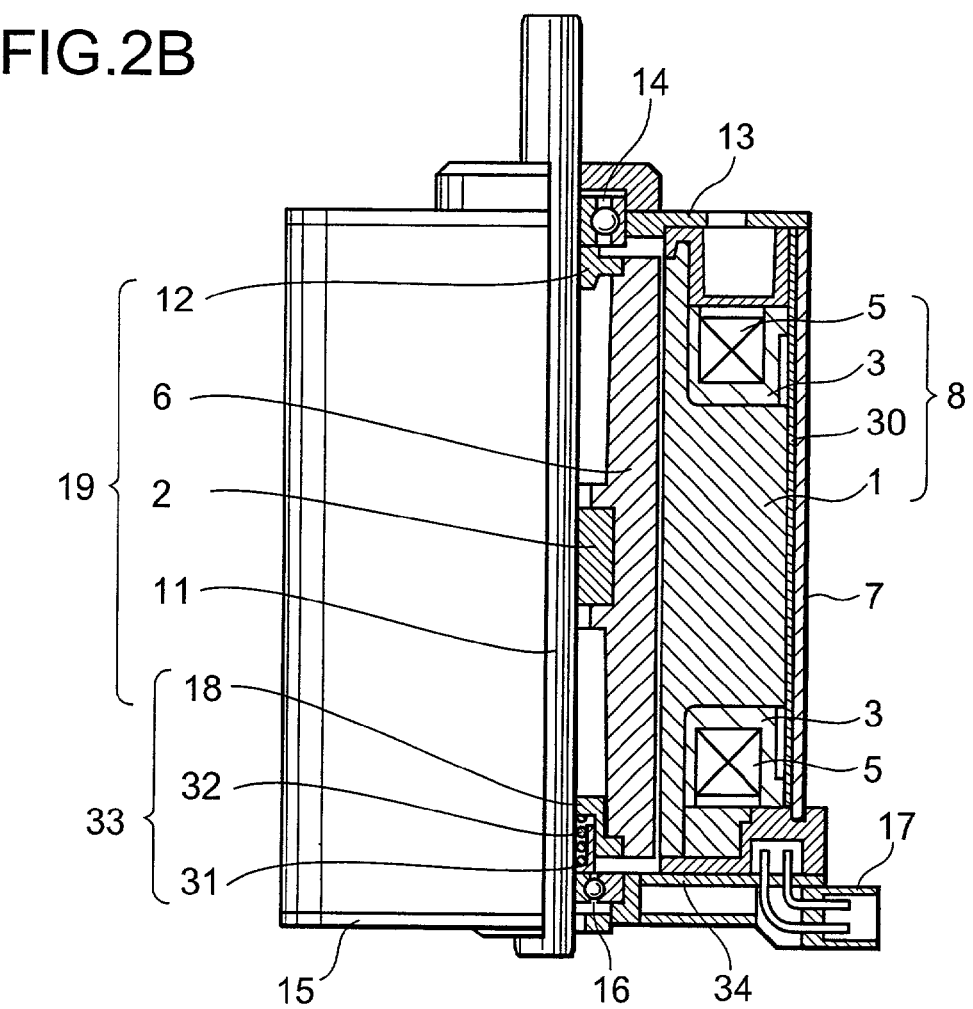

FIGS. 2A and 2B show an inner rotor type DC motor according to the present invention, in which FIG. 2A is a partially cutaway plan view, and FIG. 2B is a partially cutaway side view.

As shown in FIGS. 2A and 2B, this inner rotor type DC unit is mainly comprised of stator units 8 and a rotor unit 19.

Each stator unit 8 is mainly comprised of a plurality of stator yokes 1 and a plurality of coil unit 5. Each of the stator yoked is formed by circumferentially by stacking a large number of thin plates, each constituting a salient pole. Each of the coil unit 5 is formed by winding a magnet wire on a bobbin 3 made of a polymeric material and mounted on the stator yoke 1. The plurality of stator units 8 are arranged inside a ring 30 equidistantly, and are coupled to each other through the ring 30, thus forming a magnetic path. The thin plates that form the stator yoke 1 are obtained by punching a soft magnetic steel plate.

The rotor unit 19 has a rotating shaft 11, cylindrical field magnet 6, sleeve 2, first holder 12, and spring holder 33. The rotating shaft 11 is pressed into the center of the field magnet 6 to be fixed to it. The sleeve 2 is formed at substantially the center of the field magnet 6 in the axial direction to connect the rotating shaft 11 and field magnet 6. The first holder 12 is formed on one side of the field magnet 6. The spring holder 33 is made up from a first holder 12 formed on the other side of the field magnet 6, a third holder 31, and a spring 32 sandwiched between the second and third holders 18 and 31. The rotating shaft 11 is rotatably attached to a case 7 through a bearing 14 mounted on a flange 13 formed on one end of the field magnet 6 and a bearing 16 mounted on a flange 15 formed on the other end of the field magnet 6. The field magnet 6 fixed to the rotating shaft 11 opposes the stator yoke (salient pole unit) 1 of the plurality of stator units 8 through a small gap.

The field magnet 6 is hollow so it requires a minimum amount of material, and maintains coaxiality with the rotating shaft 11 by means of the holder 12 and spring holder 33 formed at its two ends and the sleeve 2 formed at substantially its center.

The flanges 13 and 15 are fixed to the upper and lower ends of the case 7 to form an outer container. A connector 17 is connected to the coil units 5 through a base 34 and to an external driving circuit (not shown).

Figure 3A:
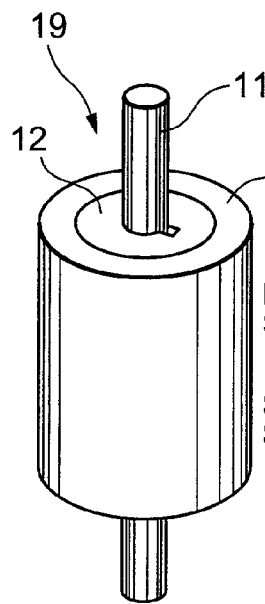
FIG. 3A is a perspective view of a rotor unit according to the present invention.
Figure 3B:
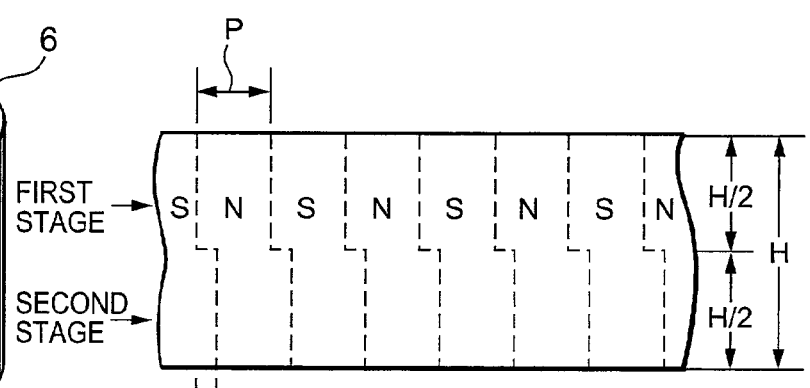
FIG. 3B is a view showing the developed pattern of S and N poles formed on the surface of the rotor unit by magnetization.

FIG. 3A is a perspective view of the rotor unit 19 used in the inner rotor type DC motor according to the present invention, and FIG. 3B is a view showing the developed pattern of S and N poles formed on the surface of the rotor unit by magnetization.

The rotor unit 19 has an outer appearance as shown in FIG. 3A. The field magnet 6 is magnetized at a predetermined pitch in its circumferential direction by using a magnetizer (not shown) to form the magnetic pole developed pattern shown in FIG. 3B.

As shown in FIG. 3B, the field magnet 6 is magnetized at a magnetization pitch P to the first and second stages divided in the axial direction of its outer surface, hence S and N poles are alternately repeated in the circumferential direction at every stage. Each stage is divided with an equal length H/2 with respect to its axial size H, and the positions of the magnetic poles of the respective stages are shifted from each other by a shift amount a (electrical angle). As shown in FIG. 3B. boundaries between the S Doles and the N poles are formed in a stepped shape in parallel with the axis of the rotating shaft.

The operation of the inner rotor type DC motor according to the present invention will be described with reference to FIGS. 2A to 3B.

The DC motor according to the present invention is a 6-slot, 8-pole, 3-phase brushless DC motor, as is apparent from FIGS. 2A to 3B.

The rotor unit 19 is rotated by the interaction of the electromagnetic field generated by simultaneously exciting the coils of the coil units 5 respectively formed in the plurality of stator units 8, and of the magnetic field of the rotor unit 19 formed of a permanent magnet. In particular, in a brushless DC motor, a coil excitation sequence is predetermined in accordance with a position detection signal from the field magnet 6, and each coil is excited by this excitation sequence uniquely.

Generally, the position of the field magnet 6 is detected by a position detector (not shown), e.g., a Hall sensor which, in the structure shown in FIG. 2B, is attached to the upper surface of the base 34 and opposes the lower end face of the field magnet 6 to detect a magnetic field leaking from the lower end of the field magnet 6.

The DC motor according to this embodiment has 3 phases, 8 poles, and 6 stator units. The number of coil units 5 is 6, and the number of position detectors is 3. The 6 coil units 5 are arranged symmetrically with respect to the center of the motor. Each pair of coil units opposing each other at 180° are connected in series to form one phase. Such a coil unit pair are prepared equiangularly for 3 sets (three phases that are respectively called U, V, and W phases) at 60°.

The 3 position detectors are arranged respectively between the U and V phases, V and W phases, and W and U phases of the stator units 8, to output 6 different detection outputs at the respective positions.

The excitation sequences of the respective phase coils with respect to the rotor position detection signal are the same as those in an ordinary 3-phase brushless motor, as shown in the following Table 1.

TABLE 1

| Rotational Direction | Output from Position Detector | | | Coil Excitation | | |
|---|---|---|---|---|---|---|
| | U Phase | V Phase | W Phase | U Phase | V Phase | W Phase |
| Forward | 1 | 0 | 1 | H | L | — |
| Forward | 1 | 0 | 0 | H | — | L |
| Forward | 1 | 1 | 0 | — | H | L |
| Forward | 0 | 1 | 0 | L | H | — |
| Forward | 0 | 1 | 1 | L | — | H |
| Forward | 0 | 0 | 1 | — | L | H |
| Reverse | 1 | 0 | 1 | L | H | — |
| Reverse | 1 | 0 | 0 | L | — | H |
| Reverse | 1 | 1 | 0 | — | L | H |
| Reverse | 0 | 1 | 0 | H | L | — |
| Reverse | 0 | 1 | 1 | H | — | L |
| Reverse | 0 | 0 | 1 | — | H | L |

Note 1: Of the outputs from the position detector, "1" and "0" indicate that the N and S poles, respectively, of the field magnet are detected.
Note 2: Coil excitation indicates that a current is supplied from the "H" phase to the "L" phase.
Also, "—" indicates a coil open state.

Figure 4:
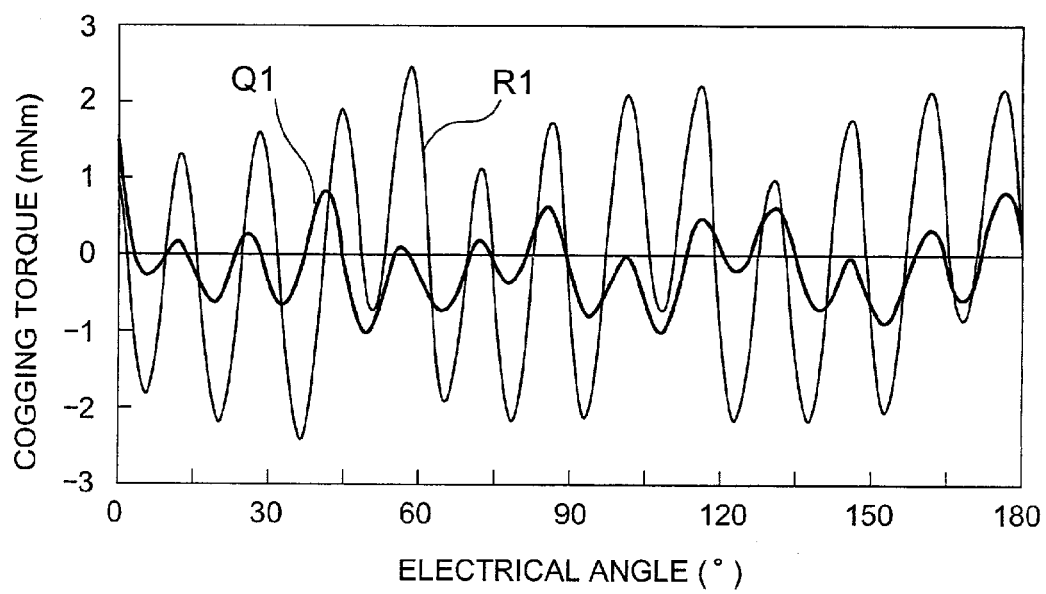
FIG. 4 is a graph of cogging torque characteristics with respect to an electrical angle when the rotor unit is rotated.

FIG. 4 is a graph showing cogging torque characteristics with respect to the electrical angle (shift angle α) when the rotor unit 19 of the inner rotor type DC motor according to the present invention is rotated.

Reference symbol R1 denotes the cogging torque characteristic of the conventional inner rotor type DC motor, and Q1 denotes the cogging torque characteristic of the inner rotor type DC motor according to the present invention when the shift amount α of the position of the magnetic pole described above is 25° in the electrical angle.

As shown in FIG. 4, the cogging torque characteristic R1 of the conventional inner rotor type DC motor generally varies within an amplitude range of about 2.5 mNm in the positive and negative directions, while the cogging torque characteristic Q1 of the inner rotor type DC motor according to the present invention generally falls within an amplitude range of about 1 mNm in the positive and negative directions. Hence, cogging is reduced greatly.

Figure 5:
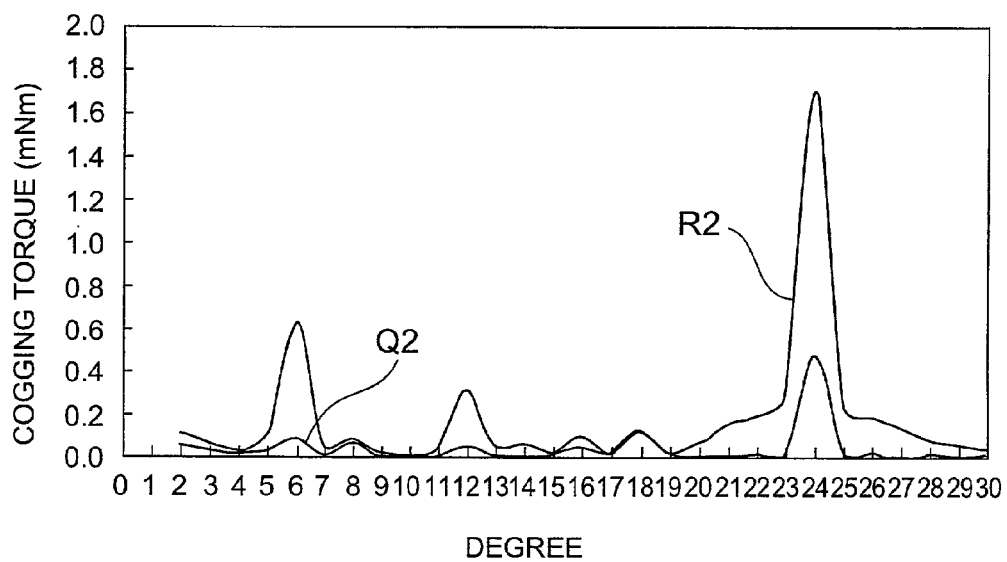
FIG. 5 is a graph showing the analytic result of the frequency of the cogging torque obtained by subjecting the cogging torque to fast Fourier transform (FFT)

FIG. 5 is a graph showing a result obtained from frequency analysis of the cogging torque by subjecting the cogging torque to fast Fourier transform (FFT).

The basic degree of the cogging torque of the DC motor according to the present invention is 24, since this DC motor is a 6-slot, 8-pole motor.

Reference symbol R2 denotes the FFT analytic result of the cogging torque of the conventional inner rotor type DC motor, and Q2 denotes the FFT analytic result of the cogging torque of the inner rotor type DC motor according to the present invention when the shift amount α of the position of the magnetic pole described above is 25° in the electrical angle.

As shown in FIG. 5, when compared to the FFT analytic result R2 of the cogging torque of the conventional inner rotor type DC motor, the FFT analytic result Q2 of the cogging torque of the inner rotor type DC motor according to the present invention is generally low, and particularly at the 24th degree which is the basic degree, the cogging torque is as very low as ⅓ times or less.

Figure 6:
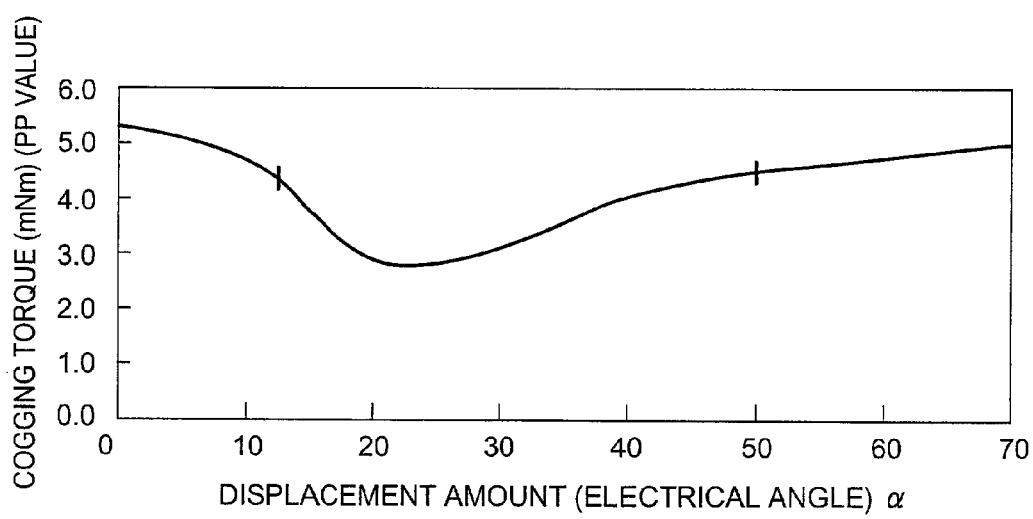
FIG. 6 is a graph of cogging torque experimentally obtained with respect to a shift amount α (electrical angle).

FIG. 6 is a graph showing the PP value (peak-to-peak value) of the cogging torque experimentally obtained with respect to the shift amount α (electrical angle) of the magnetic pole position described above.

As shown in FIG. 6, in the range where the shift amount α (electrical angle) is from 12° to 50°, the cogging torque is reduced by 20% or more. It was confirmed that the voltage characteristics of the counterelectromotive force were close to a smooth sine wave.

As described above, in the inner rotor type brushless DC motor according to the present invention, since voltage characteristic Q of the counter electromotive force corresponds to the torque characteristic, smooth torque characteristic can be obtained. Hence, a simple-structure, low-cogging, low-vibration DC motor can be provided.

Figure 3C:
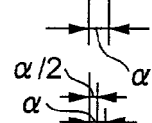
FIG. 3C is a view showing a relationship about magnetized pattern between the field magnet and position magnet.

In this embodiment, the mounting position of the rotor (field magnet) position detection element on the base 34 is adjusted by ½ the shift amount α of the magnetic pole of the rotor (field magnet), as shown in FIG. 3C, so that the present invention can be applied to a motor that rotates in forward and reverse directions.

In this embodiment, the field magnet 6 is magnetized divisionally into the two stages, i.e., the first and second stages in the axial direction. However, the present invention is not limited to this, and the field magnet can be magnetized divisionally into a plurality of stages in accordance with applications (objects).

The present invention is not limited to an inner rotor type brushless DC motor. The same effect can be obtained with an outer rotor type brushless DC motor if magnetization is performed in the same manner as that described above.

Regarding applications of the brushless DC motor, when the rotating shaft needs to rotate both in the forward and reverse directions, the conventional motor requires a large number of magnet as it has an exclusive field magnet for detecting rotor position due to switching excitation.

According to the present invention, since one end face of the field magnet 6 is additionally magnetized for detecting rotor position (so called "position magnet") as to a face position detector mounted on the base 34, the rotating shaft can rotate in both the forward and reverse directions without increasing the number of magnets. FIG. 3C is a view showing a relationship about magnetized pattern between the field magnet and position magnet. Each neutral position on each position magnet is shown by a solid line and, on the other hand, dotted lines show the neutral positions on both first stage and second stage of the field magnet 6, respectively. As shown in FIG. 3C, the neutral position on the position magnet exists in the center of both the neutral positions of the field magnet 6.

What is claimed is:

1. A DC motor, comprising:
   a case:
   a rotor unit which is rotatably arranged within the motor and includes a single hollow cylindrical field magnet fixed to holder means into which a rotating shaft is press-fitted at a center thereof, said cylindrical field magnet being magnetized such that South and North poles alternate with each other in a circumferential direction thereof; and
   a stator unit which is circumferentially arranged around said rotor unit and is comprised of a ring arranged in the case and a plurality of stator yokes so arranged as to oppose said field magnet with a small gap, each of said stator yokes being formed by circumferentially stacking a large number of thin plates each of which constitutes a salient pole, and a plurality of coil units, each being formed by winding a magnet wire on a bobbin and mounted on each of said stator yokes;
   wherein the rotor unit includes a holder fitted at one end of the field magnet and a spring holder mounted at the other end of the field magnet, the spring holder being composed of a second holder fitted at the other end of the field magnet, a third holder and a spring sandwiched between the second holder and the third holder, and
   wherein each of the South and North poles has a plurality of stages formed in an axial direction and shifted from each other in the circumferential direction of said field magnet with a predetermined shift amount, boundaries between the South poles and the North poles being formed in a stepped shape in parallel with an axis of the rotating shaft.

2. A DC motor according to claim 1, wherein the shift amount of respective stages falls within a range of 12° to 50° in an electrical angle.

3. A DC motor according to claim 1, wherein a rotor position detection element is adjusted by ½ the shift amount of respective stages.

4. A DC motor according to claim 1, wherein the motor is an inner rotor type brushless DC motor.

5. A DC motor according to claim 4, wherein the DC motor has three phases, eight poles and six stator units in which basic degree of a cogging torque thereof is 24.

6. A DC motor, comprising:
   a case:
   a rotor unit which is rotatably arranged within the motor and includes a single hollow cylindrical field magnet fixed to a holder to which a rotating shaft is coupled, said cylindrical field magnet being magnetized such that South and North poles alternate with each other in a circumferential direction thereof; and a stator unit which is circumferentially arranged around said rotor unit and includes a ring arranged in the case and a plurality of stator yokes so arranged as to oppose said field magnet, each of said stator yokes including a large number of circumferentially-stacked thin plates each of which constitutes a salient pole, and a plurality of coil units;

wherein the rotor unit includes a holder fitted at one end of the field magnet and a spring holder mounted at the other end of the field magnet, the spring holder being composed of a second holder fitted at the other end of the field magnet, a third holder and a spring sandwiched between the second holder and the third holder, and wherein each of the South and North poles has a plurality of stages formed in an axial direction and shifted from each other in the circumferential direction of said field magnet with a predetermined shift amount, boundaries between the South poles and the North poles being formed in a stepped shape in parallel with an axis of the rotating shaft.

7. The DC motor according to claim 6, wherein said rotating shaft is press-fitted at a center of said holder.

8. The DC motor according to claim 6, wherein each of said coil units is formed by winding a magnet wire on a bobbin and mounted on each of said stator yokes.

9. The DC motor according to claim 6, wherein the shift amount of respective stages falls within a range of 12° to 50° in an electrical angle.

10. The DC motor according to claim 6, wherein a rotor position detection element is adjusted by ½ the shift amount of respective stages.

11. The DC motor according to claim 6, wherein the motor is an inner rotor type brushless DC motor.

12. The DC motor according to claim 11, wherein the DC motor has three phases, eight poles and six stator units in which a basic degree of a cogging torque thereof is 24.

13. A DC motor, comprising:

a case:

a rotor unit which is rotatably arranged within the motor and including a rotating shaft press-fitted to a sleeve, a single tubular field magnet and holders arranged at both ends of said field magnet, wherein said sleeve is secured on a portion of an inner periphery of said field magnet, said field magnet being magnetized such that South and North poles alternate with each other in a circumferential direction thereof, each of the South and North poles having a plurality of stages formed in an axial direction and shifted from each other in the circumferential direction of said cylindrical field magnet with a predetermined shift amount, wherein the rotor unit includes a holder fitted at one end of the field magnet and a spring holder mounted at the other end of the field magnet, the spring holder being composed of a second holder fitted at the other end of the field magnet, a third holder and a spring sandwiched between the second holder and the third holder; and a stator unit which is circumferentially arranged around said rotor unit and is comprised of a ring arranged in the case and a plurality of stator yokes so arranged as to oppose said cylindrical field magnet with a small gap, each of said stator yokes being formed by circumferentially stacking a large number of thin plates each of which constitutes a salient pole, and a plurality of coil units, each being formed by winding a magnet wire on a bobbin and mounted on each of said stator yokes.

14. The DC motor according to claim 13, wherein the shift amount of respective stages falls within a range of 12° to 50° in an electrical angle.

* * * * *